United States Patent
Bar Hillel et al.

(10) Patent No.: US 9,400,945 B2
(45) Date of Patent: Jul. 26, 2016

(54) SYSTEM AND METHOD OF FAST OBJECT DETECTION USING PARTS TO WHOLE FRAGMENT DETECTION

(75) Inventors: Aharon Bar Hillel, Kiryat Ono (IL); Dan Levi, Kiryat Ono (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 388 days.

(21) Appl. No.: 13/241,908

(22) Filed: Sep. 23, 2011

(65) Prior Publication Data
US 2013/0077873 A1 Mar. 28, 2013

(51) Int. Cl.
*G06K 9/68* (2006.01)

(52) U.S. Cl.
CPC ........................................ *G06K 9/68* (2013.01)

(58) Field of Classification Search
None
See application file for complete search history.

(56) References Cited

U.S. PATENT DOCUMENTS

| | | | |
|---|---|---|---|
| 6,647,139 B1 * | 11/2003 | Kunii et al. | 382/159 |
| 2003/0061233 A1 * | 3/2003 | Manasse et al. | 707/104.1 |
| 2004/0249774 A1 * | 12/2004 | Caid et al. | 706/14 |
| 2007/0071290 A1 * | 3/2007 | Shah et al. | 382/118 |
| 2008/0214301 A1 * | 9/2008 | Sandige et al. | 463/31 |
| 2009/0083228 A1 * | 3/2009 | Shatz et al. | 707/3 |
| 2009/0287621 A1 | 11/2009 | Krupka et al. | |
| 2010/0027895 A1 * | 2/2010 | Noguchi et al. | 382/224 |
| 2010/0272366 A1 * | 10/2010 | Meng et al. | 382/190 |
| 2011/0123064 A1 * | 5/2011 | Teng et al. | 382/100 |
| 2011/0182422 A1 * | 7/2011 | Anderson et al. | 380/30 |

FOREIGN PATENT DOCUMENTS

| | | | | |
|---|---|---|---|---|
| CN | 101872177 A | 10/2010 | | |
| WO | WO 2010020101 A1 * | 2/2010 | | H04L 29/06 |

OTHER PUBLICATIONS

Lin, Zhe, and Larry S. Davis. "Shape-based human detection and segmentation via hierarchical part-template matching." Pattern Analysis and Machine Intelligence, IEEE Transactions on 32, No. 4 (2010): 604-618.*
Ullman, Shimon, and Boris Epshtein. "Visual classification by a hierarchy of extended fragments." In Toward Category-Level Object Recognition, pp. 321-344. Springer Berlin Heidelberg, 2006.*

(Continued)

*Primary Examiner* — Sumati Lefkowitz
*Assistant Examiner* — Carol Wang
(74) *Attorney, Agent, or Firm* — Mark S. Cohen; Pearl Cohen Zedek Latzer Baratz LLP

(57) ABSTRACT

A system and method may compare an image vector representing an image feature of a first image fragment of an image to database vectors representing the image feature of database image fragments of database images. It may be determined based on the comparison a first matching database vector of the database vectors which most closely, among the database vectors, describes the first image feature represented by the image vector. The system or method may determine, using a data structure in conjunction with the first matching database vector and previously matched database vectors, a second of the database vectors which includes the first matching database vector and the previously matched database vectors and most closely describes a second image fragment including the first image fragment. The system or method may determine an object feature based on the second database vector.

8 Claims, 6 Drawing Sheets

(56) References Cited

OTHER PUBLICATIONS

Luo, Jie, and Mario A. Nascimento. "Content based sub-image retrieval via hierarchical tree matching." In Proceedings of the 1st ACM international workshop on Multimedia databases, pp. 63-69. ACM, 2003.*
U.S. Appl. No. 13/080,717, filed Apr. 6, 2011, Levi et al.
Dollar, et al. "Integral Channel Features," BMVC 2009, pp. 1-11, London, England.
Zaklouta, et al. "Real-time traffic sign recognition using spatially weighted HOG trees." The $15^{th}$ International Conference on Advanced Robotics, Tallinn University of Technology Tallinn, Estonia, Jun. 20-23, 2011.
Office Action for DE Patent Application No. 10 2012 216 626.2 dated Dec. 6, 2013.
Office Action for CN Patent Application 201210353567.8 Dated Jul. 20, 2015.

* cited by examiner

SYSTEM AND METHOD OF FAST OBJECT DETECTION USING PARTS TO WHOLE FRAGMENT DETECTION

FIELD OF THE INVENTION

The present invention is related to detecting an object in an image using, for example, vectors describing image features, an image database, a data structure and other information.

BACKGROUND

Computer based object detection systems and methods are used in many different applications including, for example, vehicle active safety features, smart surveillance systems, and other applications. Object detection may, for example, be used in vehicle active safety features to detect, identify, and classify features in objects that are in close proximity to the vehicle. A vehicle forward collision alert (FCA) system may, for example, use an object detection system to determine if an object or person (e.g., a child, pedestrian, or other object) in front of or behind the vehicle poses a collision threat to the vehicle. An object detection system may, for example, evaluate the pose or orientation that a pedestrian is standing in to determine whether, for example, the pedestrian is moving toward the vehicle.

Object detection systems may detect objects by comparing portions of images captured with a computer imaging device such as a camera to a database of image portions in order to classify or detect objects in the image. To compare two image portions, object detection systems may calculate one or more multi-dimensional vectors, histogram representations, or other form of data representing or describing image features or parts of image features. Vectors representing each of two or more images or portions of two or more images may be compared to determine whether the images match or are similar to one another. In order to classify an image (e.g., to detect a person or object in an image), part of an image or a portion of an image, the image may be compared to a large database of images or portions of images to determine a closest match. The image comparison process may require extensive computing power depending on the size of the image and the quantity of images in the database. Faster and more efficient methods of comparing images to detect objects or features in an image may increase the functionality and efficiency of object detection systems.

SUMMARY

In some embodiments, a processor may compare an image vector representing an image feature of a first image fragment of an image to one or more database vectors representing the image feature of one or more database image fragments of database images. The processor may determine based on the comparison of the image vector to the one or more database vectors, a first matching database vector of the database vectors which most closely, among the database vectors, describes the first image feature represented by the image vector. The processor may determine, using a data structure in conjunction with the first matching database vector and one or more previously matched database vectors, a second of the database vectors which comprises the first matching database vector and the one or more previously matched database vectors and most closely, among the database vectors, describes a second image fragment comprising the first image fragment. The processor may determine an object feature based on the second database vector and output data representing the object feature to a user.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
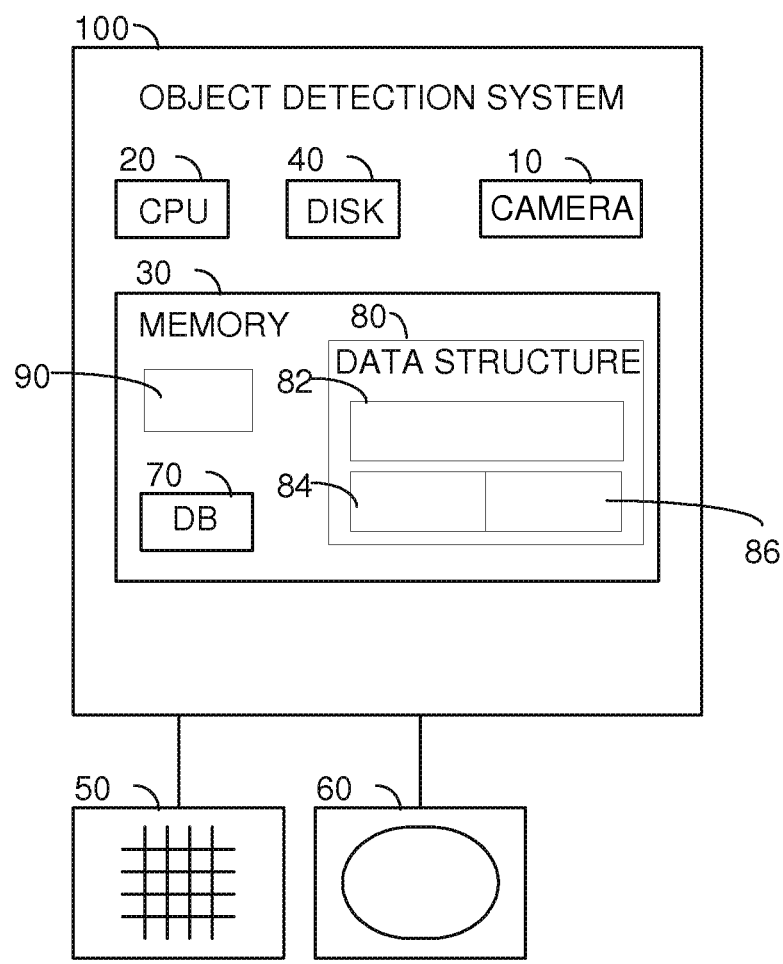
FIG. 1 is a schematic diagram of an object detection system according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of the invention. It will however be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Object or feature detection systems and methods may compare two or more fragments or portions of images in order to classify, identify, or detect features, characteristics, people, figures or objects within the fragments based on the comparison(s). In order to classify features within an image, an object detection system may divide an image into one or more areas such as spatial cells or spatial bins. The spatial cells may be arranged into array(s), image array(s), spatial cell array(s) (e.g., a 4 cell by 4 cell (4×4) array, 8×16 array or other sized array of spatial cells), or other data structure(s). The term fragment may refer to a whole image or a portion of an image. For example, a fragment may be a spatial cell, an array of spatial cells, a portion of an image, a whole image, or other component of an image.

One or more spatial cells may be analyzed by the object detection system to calculate a multi-dimensional vector, high dimension vector, codeword, or other data set that numerically or otherwise represents the image features or characteristics within one or more spatial cells. A spatial cell or image features within a spatial cell may, for example, be represented by a multi-dimensional vector or codeword (e.g. an 8 dimensional (8-D) vector). An array of spatial cells may, for example, be represented by a multi-dimensional vector (e.g., a 128-D vector representing a 4 cell×4 cell array), and that multi-dimensional vector may include the multi-dimensional vectors representing the spatial cells included in the array of spatial cells. Codewords and vectors of other dimensions may be used.

One or more vectors may be, for example, scale invariant feature transform (SIFT) vector(s), histogram of ordered gradients (HOG) vector(s), and/or other types of vector(s). The multi-dimensional vector may be a representation, description, or approximate description, of object(s), feature(s), or characteristic(s) within a fragment (e.g., a spatial cell or array of spatial cell(s)). A vector, multi-dimensional vector or codeword when used herein may be an ordered list of data elements representing, describing, and/or numerically representing characteristics, feature channels, or features (e.g., gradient direction(s), lightness, darkness, brightness, hue, color, texture, gradient histograms, color histogram, grayscale histogram, non-linear transformations, pointwise transformations, integral histograms, and other features or characteristics) of a fragment(s). The term codeword as used herein may be equivalent to the terms vector, multidimensional vector, and other terms. The term codeword may, however, be different from the term codeword index discussed below.

According to some embodiments of the invention, a database of fragments that may include images, partial images, or portions of images may be created. Each of one or more fragments may include or represent objects, which may be used to classify captured images. During a learning operation, multi-dimensional vectors, high dimension vector, codewords, or other data sets representing database fragments (e.g., images, partial images or portions of images) or other information in the database may be created. Fragments in the database, represented by multi-dimensional vectors, may be images or portions of images of, for example, people of different age, size and shape in different poses; vehicles in different orientations; parts of vehicles in different orientations; objects in different orientations; or other objects and features. The database fragments may be, for example, portions of images that have been divided into one or more spatial cells and/or arrays of spatial cells. A multi-dimensional vector may represent features of object(s) in the one or more spatial cells and/or arrays.

According to some embodiments, an image may be captured by a computer vision sensor (e.g., a camera) associated with an object detection system or otherwise input to an object detection system. The image data captured may be organized by dividing the image into one or more spatial cells or spatial bins. A spatial cell may, for example, be a 10×10 pixel area or other sized area within the image. Spatial cells may be arranged into arrays of spatial cells, for example, an array may include a 4×4 grid of spatial cells. Other sized grids and arrays may be used. An array of spatial cells may overlap other arrays within the image. One spatial cell may, therefore, be located in multiple arrays.

An object detection system may calculate a multi-dimensional vector (e.g., SIFT vector, HOG vector, or other vector) for each cell and/or array of cells. In a typical object detection system, each multi-dimensional vector representing fragments of the captured image may be compared to multiple database multi-dimensional vectors representing database fragments. A system may, in some embodiments, compare vectors representing captured image fragments to vectors representing database fragments using an approximate nearest neighbor data structure (e.g., hash table, k-dimensional tree (KD-tree), locally sensitive hashing (LSH), or other data structure). A typical object detection system may determine based on the comparisons, which of one or more vectors in the database is most similar to or most closely, among the database vectors, matches the multi-dimensional vector representing the fragment of the captured image. Objects and features in the captured image may thus be identified or classified based on the similarity of fragments of the captured image and database fragments.

In one embodiment of the present invention, an object detection system may use a scale invariant feature transform (SIFT) object or feature detection method. A SIFT method may organize the spatial cells of database images and/or captured images into multiple 4×4 arrays of spatial cells. An object detection system may calculate multi-dimensional vectors (e.g., a SIFT vector). SIFT vectors may represent the gradient direction(s) or other image features or feature channels within spatial cells or arrays or spatial cells (e.g., 2×1 array, 2×2 array, 4×4 array or other sized arrays). A SIFT vector representing a 4×4 array may, in some embodiments, be a 128 dimensional (128-D) vector or vector of another dimension. Object detection system may compare each SIFT vector (e.g., a 128-D vector) representing a fragment of a captured or input image to a database of SIFT vectors (e.g., multiple 128-D vectors) to determine a match, or closest match. Object detection may also, in some embodiments, determine which database SIFT vector most closely, among the database SIFT vectors, describes or matches the information in the SIFT vector representing a fragment of a captured or input image. Comparing multiple high dimensional vectors, however, may require extensive computing power and may be inefficient.

In one embodiment of the present invention, an object detection system may use a histogram of ordered gradients (HOG) method of object detection. HOG vectors may represent the gradient direction(s) or other image features or feature channels within spatial cells or arrays or spatial cells (e.g., 2×1 array, 2×2 array, 4×4 array or other sized arrays). The HOG method of object detection may organize the spatial cells of database and/or captured images into, for example, an 8×16 array of spatial cells. An object detection system employing a HOG method may compare images using methods similar to those used in SIFT method or other object detection methods.

Some embodiments of the invention may use SIFT and HOG vectors; other embodiments may use other techniques. Embodiments of the present invention include any object or feature detection method that divides a portion of an image into a grid of spatial cells with a vector or codeword representing each spatial cell or arrays of spatial cells. The vectors or codewords may represent, in some embodiments, various types of image feature or channel feature (e.g., gradient directions, gradient histograms, color histogram, grayscale histogram, non-linear transformations, pointwise transformations, integral histograms, and other features).

According to an embodiment of the invention, database whole vector(s) (e.g., SIFT vectors, HOG vectors or other types of vectors) representing array(s) of spatial cells in database images are decomposed into a hierarchy of database sub-part or component vectors. In one embodiment, a database whole vector describing or representing a 4×4 array of spatial cells may, for example, be decomposed into multiple sub-part vectors each describing 2×4 arrays of spatial cells within the 4×4 array. The sub-part vectors describing the 2×4 arrays may, for example, be decomposed into sub-part vectors describing 2×2 arrays of cells within the 2×4 array. The sub-part vectors may be repetitively, iteratively, or otherwise decomposed until multiple sub-part vectors describing 1×1 arrays are calculated which collectively describe all spatial cells, sub-parts or components of the whole 4×4 array.

In some embodiments, a data structure (e.g., a hash table, k-d tree, or other data structure) may be created. The data structure (e.g., a hash table, k-d tree, or other type of data structure) may include the whole vectors and sub-part vectors representing the database fragments. The data structure may also include codeword indexes, vector indexes or tags. The codeword indexes may, for example, be associated with each of the database sub-part vectors (e.g., sub-part vectors representing 1×1 arrays, sub-part vectors representing 2×2 arrays, sub-part vectors representing 2×4 arrays) and/or database whole vectors (e.g., a vector representing a 4×4 array).

The data structure may, in some embodiments, include pointers (e.g., index leaves, a pointer set or other type of data) from the codeword indexes of database sub-part vectors to the code-word indexes of database whole vectors, from which the sub-part vectors are decomposed. An object detection system may use the data structure to hash from sub-part vector(s) representing component vectors of larger sub-part vectors (e.g., vector(s) representing 2×1, 2×2, or other sized sub-part image arrays) to whole vector(s) (e.g., vector(s) representing 4×4 or other sized whole image arrays) during image comparison and object detection. Hashing from sub-part vectors to whole vectors, or parts to whole fragment detection, may increase the speed and efficiency of an object detection system according to embodiments of the present invention.

According to some embodiments, an input or captured image fragment may be divided into multiple overlapping arrays of spatial cells (e.g., 4×4 arrays of spatial cells) or fragments. In order to determine a database fragment that most closely, among the database fragments, matches the image fragment, vectors representing spatial cells of an input image fragment (e.g., image spatial cell vector(s)) may be compared to vectors representing database spatial cell fragments (e.g., database spatial cell vector(s)). The image spatial cell vector may be compared to database spatial cell vectors using an approximate nearest neighbor data structure (e.g. a KD-tree, LSH table, hash table, or other data structure). Based on the comparison, it may be determined which of the database spatial cell vectors most closely, among the database spatial cell vectors, describes or matches the image spatial cell vector. Pointers or other references may, in some embodiments, be used to point, reference, and/or index between vectors, arrays, and/or other data structures in a database, data structure, and/or other non-transitory information storage medium. Pointers or other references from the most closely matching database spatial cell to a vector representing a database fragment (e.g., a 1×2 array of spatial cells) that includes the closest matching database spatial cell may be used. Pointers or other references may be used by system to determine which database fragment (e.g., a 1×2 array of spatial cells) most closely, among the database fragments, matches an image fragment (e.g., a 1×2 array), which includes the image spatial cell. Pointers or other references from the vector representing a database fragment (e.g., a 1×2 array of spatial cells) to a vector representing a database fragment (e.g., a 2×2 array of spatial cells) that includes the database fragment may be used by system to determine which database fragment (e.g. a 2×2 array of spatial cells) most closely, among the database fragments, matches an image fragment (e.g., a 2×2 array), which includes the previously determined image fragment (e.g., a 1×2 array) and the image spatial cell. Pointers or other references may be repeatedly used by system to index in a data structure from a database fragment to a database fragment that includes the database fragment in order to determine a vector representing a database fragment (e.g., a 4×4 array of spatial cells) that most closely, among the database fragments, matches the array of spatial cells in the input image fragment. Pointers or other references may, thus, be repeatedly used by system to determine which database fragment, among the database fragments, most closely matches a larger image fragment that includes a smaller previously matched image fragment.

According to some embodiments, image vectors representing one or more overlapping image fragments (e.g., an array of spatial cells) may be compared to database fragment vector(s). A currently evaluated image fragment (e.g., a 4×4 spatial cell array) may, for example, include only one spatial cell not previously evaluated. The other cells in the currently evaluated image fragment may, for example, have been matched to database fragments in previous comparison operations when the previously evaluated image fragments that overlap the currently evaluated image fragment were compared to database image fragments. The spatial cell(s) that were not previously evaluated may be compared to database fragments to determine the closest matching database fragment. A codeword index of a closest matching database fragment may be determined A codeword index of a database spatial cell fragment adjacent to the database fragment spatial cell that matches the currently evaluated image spatial cell may be determined. The codeword index of the adjacent database spatial cell fragment may be known from previous comparison operations, for example, comparison operations to detect objects in the image fragments that overlap the currently evaluated image fragment. A codeword index associated with the database fragment that most closely, among the database fragments, matches the currently evaluated image spatial cell and a codeword index associated with the database fragment adjacent to the database fragment that most closely, among the database fragments, matches the currently evaluated image spatial cell may be used. The codeword indexes in conjunction with pointers or other references in a data structure may be used to determine a closest matching 2×1 database fragment image array. A codeword index associated with the database fragment representing the closest matching 2×1 database image array and a codeword index of a 2×1 database image array adjacent to the closest matching 2×1 sub-part array may be used in conjunction with pointers or other references to determine a closest matching 2×2 sub-part array. Codeword indexes and pointers may be repeatedly used by system to determine a 4×4 database image array matching the currently evaluated image fragment (e.g., a 4×4 spatial cell array). Similar systems and/or processes may also be used for arrays, sub-part arrays, spatial cells, and images of different sizes.

FIG. 1 is a schematic diagram of an object detection system according to an embodiment of the present invention. Object detection system 100 may include one or more computer vision sensor(s) 10 (e.g., camera(s), video camera(s), digital camera(s), image sensor(s) or other image collection device(s)). Computer vision sensor 10 may capture an image that includes one or more objects and/or features. Images may also be otherwise input into system 100 by, for example, download from another computer, database or other system. Object detection system 100 may include one or more processor(s) or controller(s) 20, memory 30, long term storage 40, input device(s) or area(s) 50, and output device(s) or area(s) 60. Input device(s) or area(s) 50 may be, for example, a touch screen, a capacitive input device, a keyboard, microphone, pointer device, a button, a switch, or other device. Output device(s) or area(s) 50 may be for example a display, screen, audio device such as speaker or headphones, or other device. Input device(s) or area(s) 50 and output device(s) or area(s) 60 may be combined into, for example, a touch screen display and input, which may be part of system 100.

System 100 may include one or more databases 70, which may include, for example, a database of images, vector(s) 90 (e.g., SIFT vector(s), HOG vector(s), or other type of vector(s)), sub-part vector(s), whole vector(s) and/or codewords describing fragment(s), spatial cells or arrays of spatial cells. Databases 70 or other storage structures or devices may, in some embodiments, include a data structure 80. Data structure 80 may include or may be one or more hash table(s) 82, k-d tree(s) or other type of data structure. Data structure 80 may include a dictionary or list of codeword indexes 84, pointers between codeword indexes 86, vector pointer(s), and other information or data. Databases 70 may be stored all or partly in one or both of memory 30, long-term storage 40, or another device.

Processor or controller 20 may be, for example, a central processing unit (CPU), a chip or any suitable computing or computational device. Processor or controller 20 may include multiple processors, and may include general purpose processors and/or dedicated processors such as graphics processing chips. Processor 20 may execute code or instructions, for example, stored in memory 30 or long term storage 40, to carry out embodiments of the present invention.

Memory 30 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 30 may be or may include multiple memory units.

Long term storage 40 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 2:
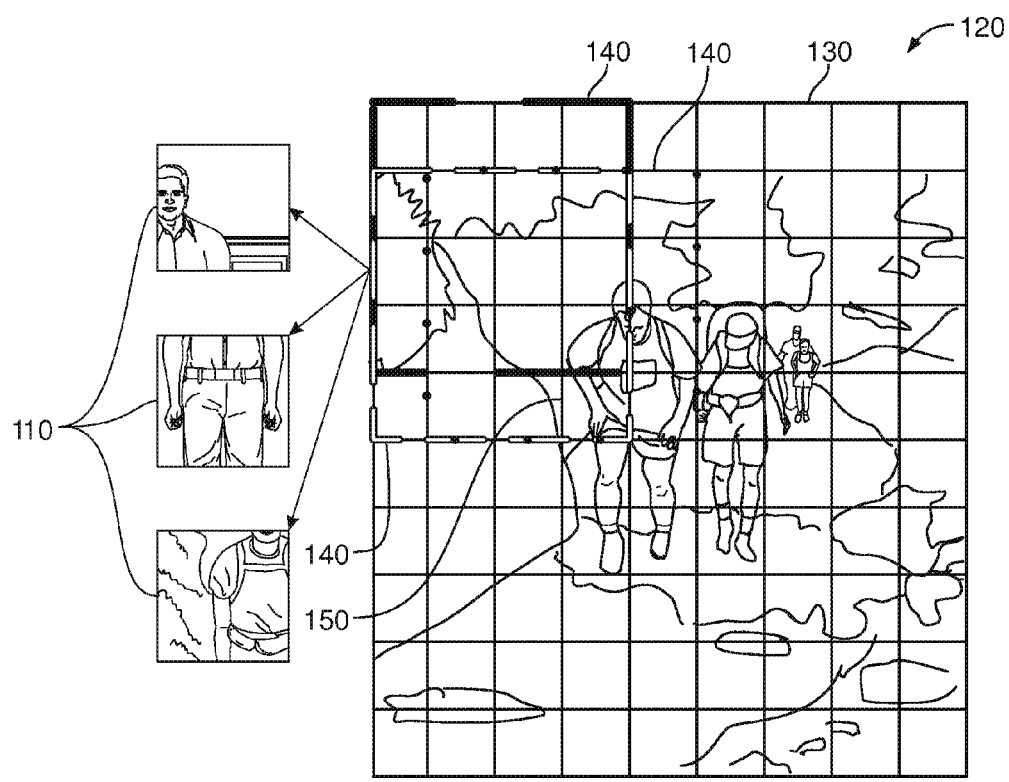
FIG. 2 is a schematic diagram of a comparison of an image divided into spatial cells and arrays of spatial cells, and one or more database images according to an embodiment of the present invention.

FIG. 2 is a schematic diagram of a comparison of an image divided into spatial cells and arrays of spatial cells, and one or more database images according to an embodiment of the present invention. A typical object detection system 100 may capture or otherwise obtain an image 120. System 100 may divide image 120 into one or more areas, spatial cells, or spatial bins 130 and/or one or more arrays of areas, spatial bins, or spatial cells 140. One or more arrays 140 (e.g., a 4×4 array) may include one or more spatial cells 130 (e.g., 16 spatial bins in a 4×4 array). Image 120 may include multiple arrays, and arrays 140 may overlap one another. One or more spatial cells 120 may each be included in or be a part of one or more arrays 140. Spatial cell 150 in image 120 may, for example, be included in three or more different or separate arrays 140 of image 120. Arrays 140 and spatial cells 130 may be referred to as fragments and may be described or represented by one or more vectors or codewords.

Object detection system 100 may include a database of fragments including images, portions of images, or partial images 110. Database images 110 (e.g. stored in database 70) may include images of, for example, people in different poses, orientations, movements, actions and configurations; objects in different orientations, configurations and viewpoints, portions of such images, and other images or portions of images. Database images 110 may each be tagged, referenced or otherwise associated with a descriptor, classifier, or other information or metadata describing the person(s), object(s), or content of the image.

System 100 may divide database image(s) 110 into one or more spatial cells 130 and/or one or more arrays. Database image(s) 110 may include one or more array(s) and the arrays may overlap one another. One or more spatial cells may be included or be a part of one or more arrays. Database image arrays and spatial cells may be referred to as database fragments and may be described or represented by one or more multi-dimensional vectors.

According to some embodiments, system 100 may compare image 120, arrays of image spatial cell(s) 140 or image spatial cell(s) 130 to one or more database image(s) 110, arrays of spatial cells in database image(s) or spatial cells in database image(s). System 100 may employ a comparison process in order to detect or classify objects or features within image 120, arrays of image spatial cell(s) 140 or image spatial cell(s) 130.

Figure 3:
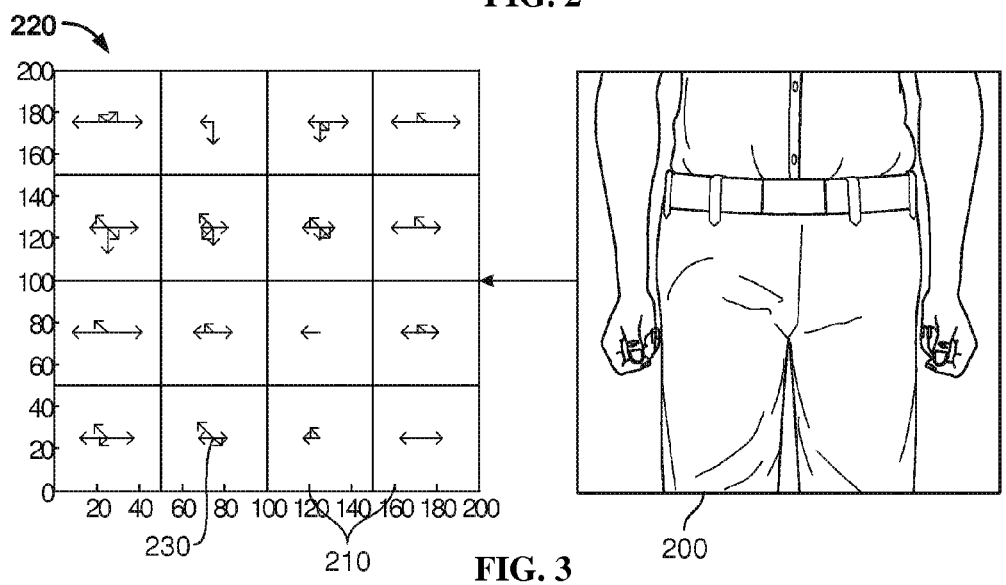
FIG. 3 is a schematic diagram of a vector representation of an array of spatial cells in an image according to an embodiment of the present invention.

FIG. 3 is a schematic diagram of an object detection system depicting a vector representation of an array of spatial cells in an image according to an embodiment of the present invention. An object detection system 100 may divide an image 200 (e.g., a database image 130, captured image 120, or other image) into one or more spatial cell(s) or bin(s) 210 and/or one or more array(s) 220. Each array may include multiple spatial cells 210, and one or more spatial cell(s) 210 may be included in one or more array(s) 220. Each spatial cell 210 and each array 220 may be described or represented by one or more codewords or multi-dimensional vector(s) 230 (e.g., a SIFT vector, HOG vector, or other type of vector). Vector 230 representing or describing a spatial cell 210 may, in one embodiment, be an 8 dimensional (8-D) vector. A vector 230 representing a 4×4 array may in one embodiment be a 128-D vector. Other sized vectors representing and/or describing other sized fragments, arrays of spatial cells, and/or spatial cells may be used.

According to some embodiments, vector 230, or elements or components of vector 230 may represent features of a fragment (e.g., an image 200, spatial cell 210 or array of spatial cells 220). Vector 230 may be an ordered list of data elements representing, describing, and/or numerically representing features (e.g., lightness, darkness, brightness, hue, color, texture, or other image features) of an image, fragment(s), array of spatial cell(s), spatial cell(s) or pixel(s). The ordered list of data elements may, in some embodiments, represent the relative strength of different orientations (e.g., horizontal, vertical, diagonal, etc.) within and image, fragment(s), array of spatial cell(s), spatial cell(s) or pixel(s). The relative strength of different orientations may be, in some embodiments, represented by a histogram of light to dark and dark to light brightness gradients in predefined directions (e.g., horizontal, vertical, or diagonal directions) within fragment(s), array of cell(s), spatial cell(s), and/or pixel(s) of an image. The data elements in the vector may, in some embodiments, represent a histogram of brightness gradient, color, hue, texture, or other image characteristic, feature and/or gradients of image characteristics within an image, fragment(s), array of spatial cell(s), spatial cell(s) or pixel(s).

Figure 4:
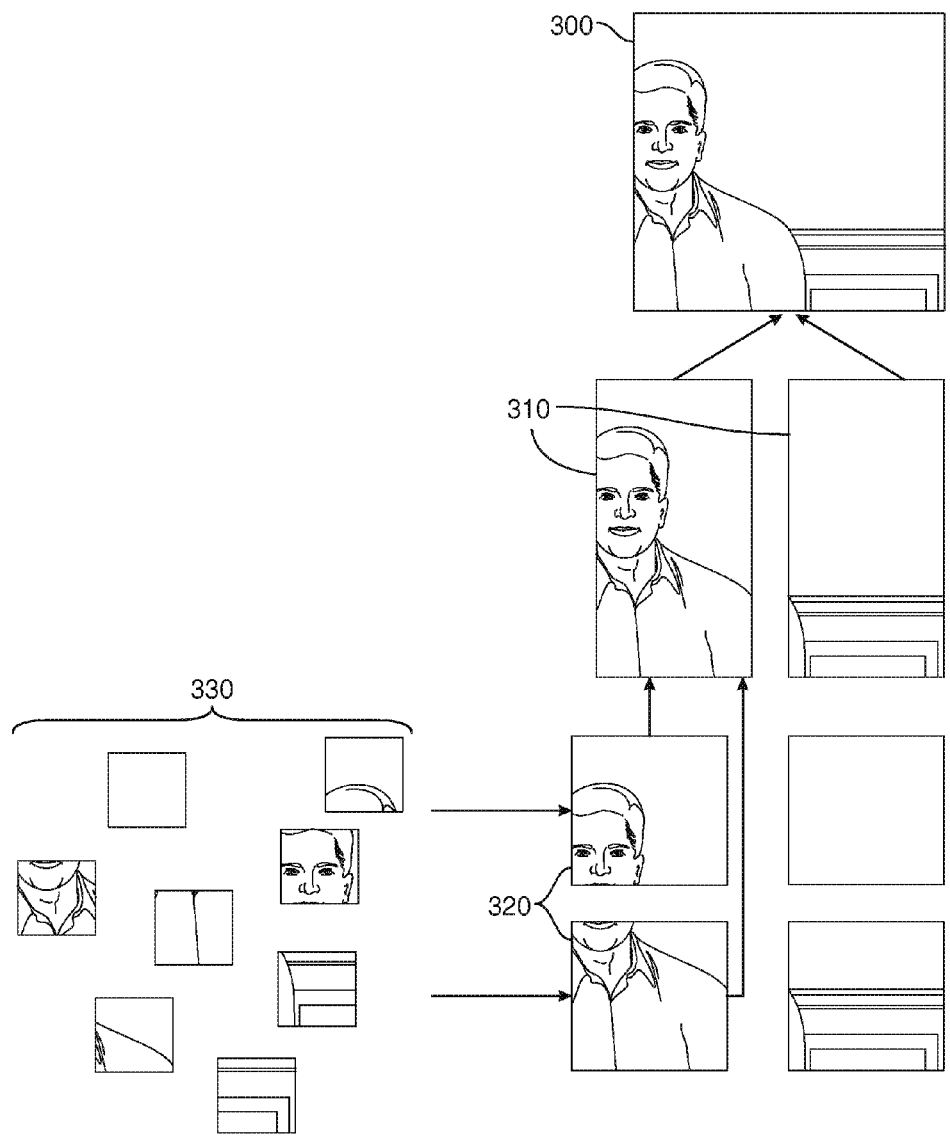
FIG. 4 is a schematic diagram of a method of dividing a whole image into sub-part images according to an embodiment of the present invention.

FIG. 4 is a schematic diagram of an object detection system according to an embodiment of the present invention. An object detection system 100 database (e.g. vector(s) 90 in database 70) may include one or more whole image arrays 300. Database whole image arrays 300 may be used by system 100 to classify or categorize captured or inputted images. A database whole image array 300 may be represented or described by a database whole vector (e.g., a SIFT vector, HOG vector or other type of vector). System 100 may decompose a database whole vector representing a whole image array 300 into a hierarchy of component(s) or database sub-part vector(s) representing or describing one or more sub-part array(s) 310 of database whole image array 300. Database whole image array 300 may, in one embodiment, be a 4×4 array and sub-part arrays 310 may be 2×4 arrays. System 100 may decompose one or more database sub-part vectors describing sub-part arrays 310 into one or more vectors or fragments describing sub-part arrays 320. Sub-part arrays 320 may, for example, be 2×2 arrays. System 100 may decompose one or more database sub-part vectors describing sub-part arrays 320 into one or more database sub-part vectors describing sub-part arrays 330. Sub-part arrays 330 may, for example, be 1×1 arrays. Sub-part arrays 330, sub-part arrays 320, and sub-part arrays 310 may all be decomposed from whole image array 300. It will be understood that the array and sub-array sizes in the example above involve one example of the present invention. The invention, however, may be generalized to be applicable to image arrays of any size or dimension.

Figure 5:
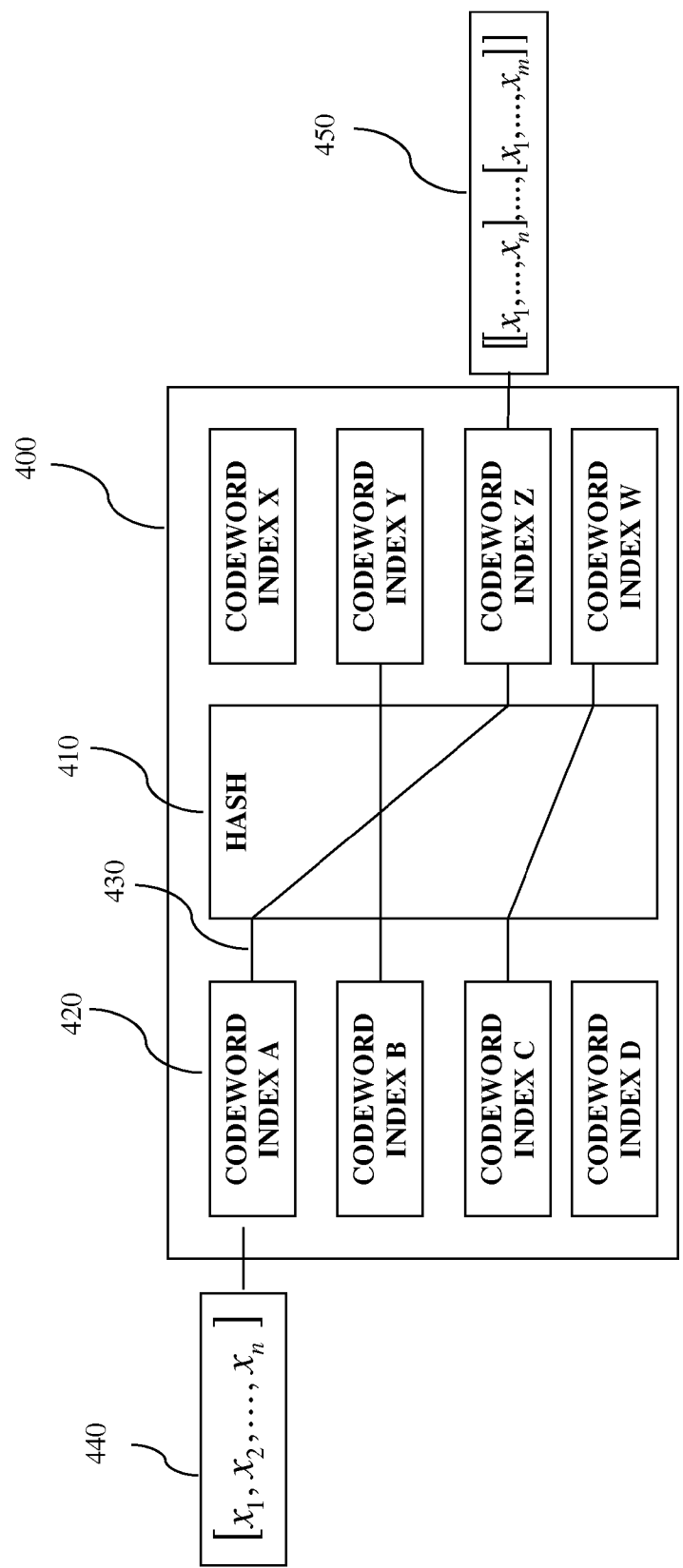
FIG. 5 is a schematic diagram of a data structure system according to an embodiment of the present invention.

FIG. 5 is a schematic diagram of a data structure system according to an embodiment of the present invention. In some embodiments, a data structure 400 (e.g., a hash table 410, k-d tree, or other data structure) may be constructed by and/or stored in system 100. Data structure 400 (e.g., a hash table 410, k-d tree, or other type of data structure) may include one or more codeword indexes 420 or tags in a dictionary of codeword indexes. Each codeword index 420 may, for example, be associated with one of database sub-part vectors 440 (e.g., a sub-part database vectors) representing sub-part arrays (e.g., sub-part arrays 310, sub-part arrays 320, sub-part arrays 330) and/or database whole vectors 450 (e.g., a whole database vector) representing whole arrays (e.g., whole image array 300). The dictionary of codeword indexes may be created or defined when the image database is created, when an image is added to the database, or at another time.

In some embodiments, a vector representing whole image array 450 (e.g., a whole database vector) may include a database sub-part vector 440 (e.g., sub-part database vector) describing sub-part arrays (e.g., sub-part array(s) 310, sub-part array(s) 320, sub-part array(s) 330) that are decomposed from database whole vector 450. A database whole vector 450 representing whole image array (e.g., whole image array 300) may, therefore in some embodiments, be associated with the same or similar codeword indexes 420 as the component vectors representing sub-part arrays 440 (e.g., sub-part array(s) 310, sub-part array(s) 320, sub-part array(s) 330) included in the whole image array 300.

According to some embodiments, a data structure 400 may include pointers 430, references, or other data that map or point from a database sub-part vector 440, describing a database sub-part array, to other database sub-part vector(s) 440 and/or to database whole vector(s) 450. The data structure 400 may, in some embodiments, include pointers 430, references, or other data that map or point from one or more codeword index(es) 420 associated with one vector 440 to one or more codeword index(es) 420 associated with another vector 450. Data structure 400 may, for example, include pointer(s) 430 from a codeword index 420 associated with database sub-part vector(s) 440 describing database sub-part array(s) (e.g., sub-part array 320, sub-part array 310) to a codeword index 420 associated with database whole vector(s) 450 describing whole image array(s) (e.g., whole image array 300) from which the sub-part array vector 440 is decomposed.

In some embodiments, database whole vector(s) 450 may include one or more sub-part vector(s) 440. A sub-part vector 440, therefore, may be directly included in or be a component of one or more whole vector(s) 450. In some embodiments, however, a sub-part vector 440 may be normalized, and the normalized sub-part vector 440 may be included in or be a component of one or more whole vector(s) 450. In some embodiments, sub-part vector(s) 440 may not be included in whole vector(s) 450.

System 100 may use the data structure 400, codeword indexes 420 and/or pointers 430 to quickly and efficiently determine vectors describing whole image array(s) (e.g., whole image array 300) and sub-part image array(s) (e.g., image array 320 and/or image array 310) from which a vector describing a sub-part image array (e.g., image array 310, image array 320 and/or image 330) is decomposed. System 100 may use a data structure 400 to hash from sub-part image arrays to whole image arrays.

Figure 6:
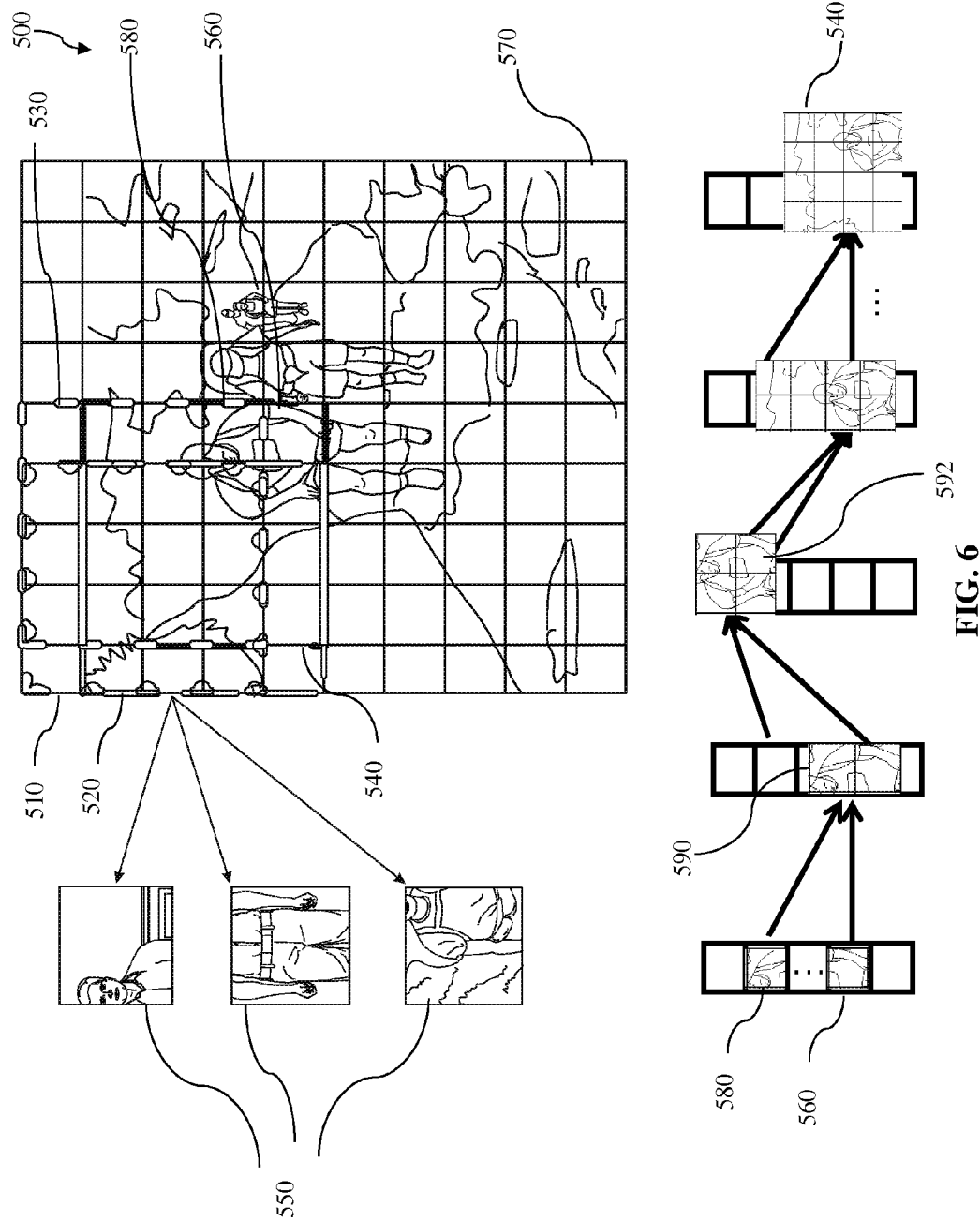
FIG. 6 is a schematic diagram of an object detection system depicting a feature detection method in which an image may be compared to multiple database images according to an embodiment of the present invention.

FIG. 6 is a schematic diagram of an object detection system according to an embodiment of the present invention. Object detection system 100 may compare an image 500 to one or more database images 550 or database image fragments 550 in order to classify or identify objects in image 500. System 100 may divide image 500 into one or more fragments or arrays (e.g., array 510, array 520, array 530, and array 540) of spatial cells 570. The one or more arrays and spatial cells may be represented or described by one or more multi-dimensional vectors or codewords.

Vectors describing image arrays (e.g., array 510, array 520, array 530, and array 540) may include large amounts of data. For example, vectors may have many dimensions. Array 510 may be, for example, a 4×4 array and the vector describing array 510 may be, for example, a 128-D vector. In order to increase speed and efficiency in the object detection process, system 100 may decompose the one or more vectors describing array 510 into vectors describing fragments, portions or sub-parts of array 510 and/or spatial cells 570 within array 510. A vector describing array 510 may, for example, be a 128-D vector and may be decomposed to one or more 64-D, 32-D, 16-D and 8-D vectors describing portions of array 510 and/or spatial cells 570 within array 510.

System 100 may compare the vectors representing arrays in an image (e.g., image array 510, image array 520, image array 530, image array 540 and other image array(s)) to the vectors (e.g., sub-part database vector(s) and whole database vector(s)) representing database image arrays. System 100 may, in some embodiments, compare decomposed or sub-part vectors or fragments, which are decomposed from vectors or fragments describing array 510, to vectors (e.g., sub-part database vector(s)) describing sub-part arrays of database images (e.g., sub-part array 310, sub-part array 320, or sub-part array 330). System 100 may, for example, determine which vector describing a database image array, sub-part of database image array, or spatial cell in database image array 550 most closely matches vector describing an image array 510, sub-part of array 510, or spatial cell in image array 500.

System 100 may, in some embodiments, determine which database vector describing a database image array 550, sub-part of database image array 550, or spatial cell in database image array 550 most closely, among the database vectors, describes the image feature described by the vector describing an image array 510, sub-part of array 510, or spatial cell in image array 500. A database vector may most closely, among the database vectors, describe an image feature if the image feature represented by the database vector is more similar to the image feature than any other image feature represented by other database vectors.

System 100 may, in some embodiments, determine which database codeword or vector most closely, among the database codewords, matches an image codeword by measuring the distance between codewords. System 100 may determine or find one or more closest match(es) by, for example, measuring or calculating the distance (e.g., the Euclidian distance or other difference calculation) between the vector or codeword describing array 510, or sub-part of array 510, and the one or more vector(s) or codeword(s) describing database image fragments or arrays 550 or sub-parts of database image fragments or arrays 550. System 100 may, for example, find which of multiple codewords describing image features of a database image arrays most closely matches the codeword describing an image feature by calculating the differences between the codeword describing the image feature and each of the multiple codewords describing image features of database image arrays. The codeword describing the image feature of a database image array that is the least distance from the codeword describing the image feature may be the most closely matching database codeword (e.g., a codeword describing the image feature of a database image array). In some embodiments, system 100 may determine the database codeword that most closely, among the database codewords, matches an image codeword by determining which database codeword is most similar in numerical value to the image codeword. Two vectors may be compared using other calculation methods. Methods of determining a match or closest match other than calculating distance may be used.

System 100, in some embodiments, may compare vectors of the same dimension, for example, 8-D vectors representing sub-parts of a captured image may be compared with 8-D vectors representing a database image sub-part array. In some embodiments, vectors of a size or dimension may be compared to vectors of the same size or dimension or to vectors of a different size or dimension.

According to some embodiments, system 100 may compare a vector (e.g., an image vector) representing a spatial cell of image array 510 (e.g., a 1×1 cell array) to one or more vector(s) (e.g., sub-part database vectors) representing database image sub-part arrays 550 of the same dimension (e.g., a database image sub-part array 550 representing a 1×1 array). Based on the comparisons, system 100 may determine which database sub-part array 550 most closely, among the database sub-part arrays, describes or matches the image characteristics or features of spatial cell of image array 510. System 100 may then determine a codeword index 420 corresponding to or describing the most closely describing or matching database sub-part vector (e.g., a database sub-part vector representing a 1×1 array). System 100 may use the codeword index 420, pointer(s) 430, and/or a data structure 400 (e.g., a hash table 82, k-d tree, or other data structure) to determine a closest describing, matching or otherwise similar database sub-part vector representing a database sub-part array of a higher dimension (e.g., a 16-D vector representing a 2×1 cell). System 100 may repeatedly use codeword index(es) 420, pointers 430 and/or a data structure 400 (e.g., a hash table 410, k-d tree, or other data structure) to determine closest matching or similar higher dimension vectors (e.g., 32-D, 64-D and 128-D vectors) representing larger database image sub-part image arrays (e.g., 2×2, 4×2, 4×4, and other sized cell arrays) from which a sub-part database vector is decomposed. Using this method, system 100 may, for example, quickly match a 4×4 image array 510 represented by a 128-D vector to a 4×4 database image array 550 represented by a 128-D vector by comparing 8-D sub-part database vectors decomposed from the 128-D whole database vectors and hashing. Other methods may be used and other size image arrays represented by other size vectors may be matched.

According to some embodiments, system 100 may compare image vectors representing one or more overlapping image arrays (e.g., image array 510, image array 520 and image array 530, image array 540) to database sub-part or whole vector(s) representing database image arrays 550. System 100 may, for example, compare image array 540 to database image arrays 550. Image array 540 may, for example, include only one spatial cell 560 not previously evaluated. The other cells in image array 540 may, for example, have been compared to database image arrays 550 when image array 510, image array 520 and image array 530 were compared to database image arrays 550 in previous comparison operations. System 100 may compare spatial cell 560 to sub-part database image arrays 550 to determine the closest matching sub-part database image array 550. System 100 may determine the codeword index 420 of the database sub-part vector representing the closest matching sub-part database array 550. System 100 may determine the codeword index 420 of a database sub-part vector representing a spatial cell adjacent to cell 560 (e.g., adjacent spatial cell 580), which may be known from previous comparison operations, for example, comparison operations to detect objects image array 530. System 100 may, for example, use codeword index 420 associated with the database sub-part vector representing the closest matching sub-part array 550 and codeword index 420 associated with the sub-part database vector matching adjacent spatial cell 580 in conjunction with pointers 430 in data structure 400 to determine a closest matching 2×1 database sub-part image array 590. Closest matching 2×1 database sub-part image array 590 may include spatial cell 560 and adjacent spatial cell 580. System 100 may use a codeword index associated with the database sub-part vector representing the closest matching 2×1 database sub-part image array 590 and a codeword index of a 2×1 sub-part database image array adjacent to the closest matching 2×1 sub-part array in conjunction with pointers 430 in data structure 400 to determine a closest matching 2×2 sub-part array 592. Closest matching 2×2 sub-part array 592 may include 2×1 sub-part database image array 590 and the 2×1 sub-part database image array adjacent to sub-part array 590. System 100 may repeat this process of parts to whole fragment detection to determine or evaluate a 4×4 database image array matching the image array 540. Pointers between codeword indexes may, thus, be repeatedly used by system to determine which database image array most closely, among the database image arrays, matches a larger image fragment that includes a smaller previously matched image fragment. Similar processes may also be used for arrays, sub-part arrays, spatial cells, and images of different sizes.

System 100 may then display an image or object feature related to the vector or codeword (e.g., the second vector or third codeword) to a user. The object feature may be, for example, a human in a particular pose, an image of a vehicle, on image of a tree, or other object. The object feature or image may be displayed or output to a user on, for example, an output device 60 (e.g., a video screen).

It will be understood that the above example involving vectors representing 4×4 image arrays (e.g., image array 520, image array 530, image array 540) may be generalized to be applicable to vectors representing any sized image arrays, for example, an HOG vector representing 8×16 arrays of spatial cells or vectors of other types and dimensions representing image arrays of various sizes.

Figure 7:
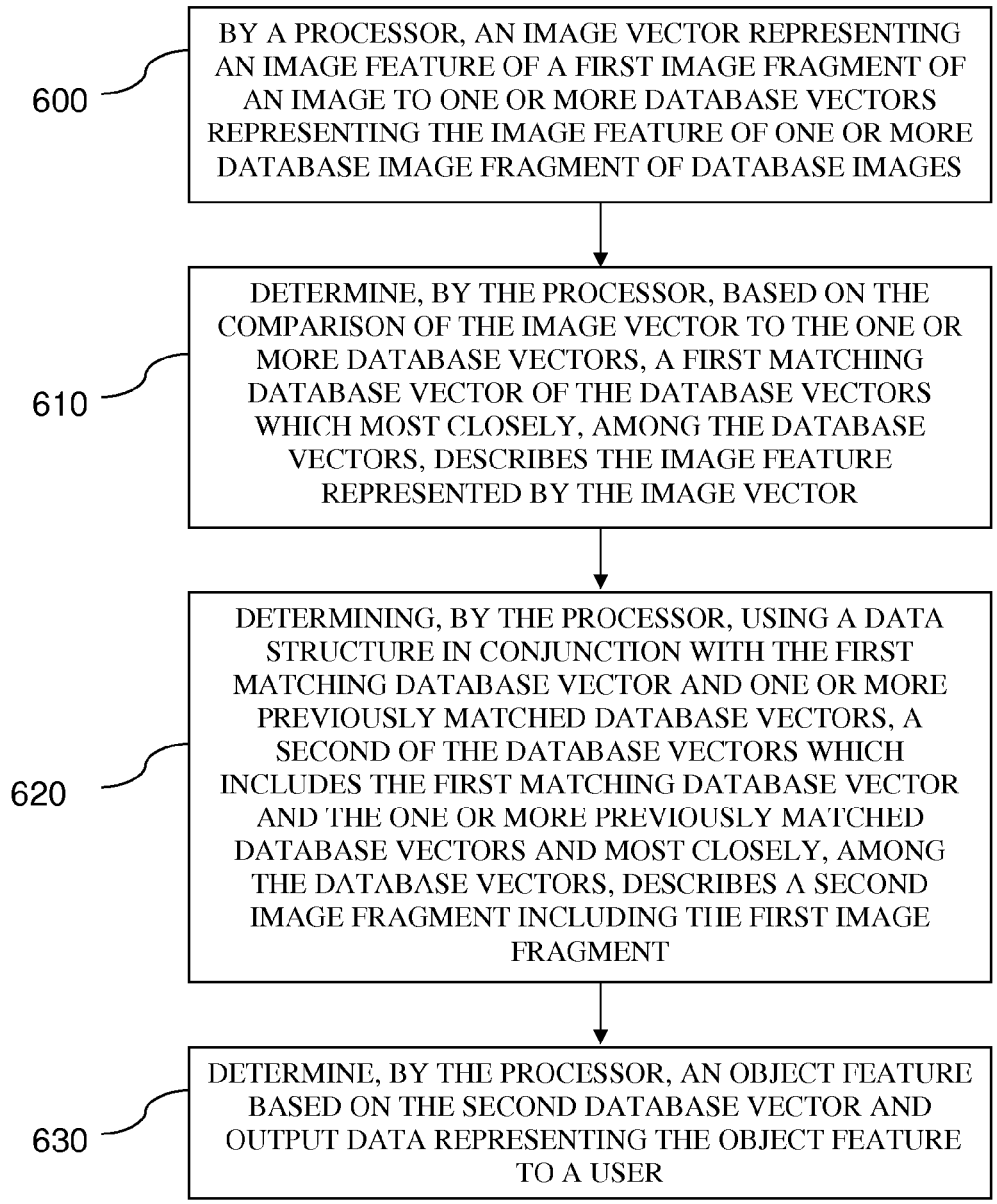
FIG. 7 is a flowchart of a method according to an embodiment of the present invention.

FIG. 7 is a flowchart of a method according to an embodiment of the present invention.

In operation 600, a processor (e.g., processor 20 of FIG. 1) may compare an image vector (e.g., vector 230 of FIG. 3) representing an first image feature (e.g., gradient direction) of an image fragment of an image to one or more database vectors representing the image feature of one or more database image fragments of database images (e.g., sub-part array 330 of FIG. 4). The processor may compare the image vector to the one or more database vectors by measuring the distance (e.g., the Euclidian distance) between the vectors.

In operation 610, the processor may determine based on the comparison of the image vector to the one or more database vectors, a first matching database vector of the database vectors (e.g. database sub-part vector 440 of FIG. 4) which most closely, among the database vectors, describes the image feature represented by the image vector.

In operation 620, the processor may determine using a data structure (e.g., data structure 400 of FIG. 5) in conjunction with the first matching database vector and one or more previously matched database vectors, a second of the database vectors (e.g., database whole vector 450 of FIG. 4) which includes the first matching database vector (e.g. database sub-part vector 440 of FIG. 4) and the one or more previously matched database vectors and most closely, among the database vectors, describes a second image fragment including the first image fragment. The data structure may, in some embodiments, include a hash table (e.g., hash table 410 of FIG. 5), codeword index(es) (e.g., codeword index 420 of FIG. 5), and/or pointer(s) (e.g., pointers 430 of FIG. 5).

In operation 630, the processor may determine an object feature based on the second database vector (e.g., database whole vector 450) and output data representing the object feature to a user. The data output to a user may be, for example, an indication that an object, e.g., an image of a human, is found in an image. The data may be displayed to a user on a display screen (e.g., output device 60 of FIG. 1), an audible alert, a light or other form of display.

Other operations or series of operations may be used.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for object detection in an image comprising:
    providing a hierarchal database of database-vectors, representing features of objects' fragments of database-objects, the database including a list of the database-vectors and their containing database-vectors; and
    using a processor for:
        identifying at least two first database-vectors from the database of vectors, which are most closely matching with two or more image-vectors describing features of at least two respective first image-fragments of the image, wherein the at least two first image-fragments are different one from another or partially overlapping, and
        detecting at least one object of the database-objects, responsive to identifying of a second database-vector from the database of vectors, wherein the second database-vector:
            comprises at least two of the first database-vectors, and
            is most closely matching with one or more image-vectors describing features of a second image-fragment of the image, further wherein the second image fragment comprises at least one of the at least two first image-fragments.

2. The method of claim 1, wherein the processor is further configured to render the database-vectors into codewords.

3. The method of claim 1, wherein the database comprises hash table or k-d tree for the database-vectors.

4. The method of claim 1, wherein the identifying of the most closely first and/or second database-vectors is implemented using an approximate nearest-neighbor structure.

5. A system for object detection in an image comprising:
    a memory loaded with an hierarchal database of database-vectors, representing features of objects' fragments of database-objects, the database including a list of the database-vectors and their containing the database-vectors; and
    a processor configured to:
        identify at least two first database-vectors from the database of vectors, which are most closely matching with two or more image-vectors describing features of at least two respective first image-fragments of the image, wherein the at least two first image-fragments are different one from another or partially overlapping, and detect at least one object of the database-objects, responsive to identification of a second database-vector from the database of vectors, wherein the second database-vector:

comprises at least two of the first database-vectors, and is most closely matching with one or more image-vectors describing features of a second image-fragment of the image, further wherein the second image fragment comprises at least one of the at least two first image-fragments.

6. The system of claim 5, wherein the processor is further configured to render the database-vectors into codewords.

7. The system of claim 5, wherein the identification of the most closely first and/or second database-vectors is implemented using an approximate nearest-neighbor structure.

8. The system of claim 5, wherein the database comprises hash table or k-d tree for the database-vectors.

\* \* \* \* \*